(12) United States Patent
Nagata et al.

(10) Patent No.: US 7,957,036 B2
(45) Date of Patent: Jun. 7, 2011

(54) FACSIMILE DEVICE AND PROGRAM PRODUCT FOR FACSIMILE PRINTING

(75) Inventors: Koichi Nagata, Toyohashi (JP); Tomoko Maruyama, Toyokawa (JP); Kana Yamauchi, Toyohashi-gun (JP)

(73) Assignee: Minolta Company, Ltd., Osaka (JP)

( * ) Notice: Subject to any disclaimer, the term of this patent is extended or adjusted under 35 U.S.C. 154(b) by 1203 days.

(21) Appl. No.: 10/641,018

(22) Filed: Aug. 15, 2003

(65) Prior Publication Data

US 2004/0190076 A1    Sep. 30, 2004

(30) Foreign Application Priority Data

Mar. 27, 2003   (JP) .................................. 2003-087975

(51) Int. Cl.
*H04N 1/00* (2006.01)
(52) U.S. Cl. ....... 358/402; 358/426; 358/437; 358/1.15; 358/1.16; 358/1.12
(58) Field of Classification Search .................. 358/402, 358/426.02, 437
See application file for complete search history.

(56) References Cited

U.S. PATENT DOCUMENTS

| | | | | |
|---|---|---|---|---|
| 6,618,160 | B1 * | 9/2003 | Kato | 358/1.14 |
| 6,775,705 | B2 * | 8/2004 | Maeda | 709/230 |
| 6,961,143 | B2 * | 11/2005 | Tsukui et al. | 358/1.15 |
| 6,982,801 | B1 * | 1/2006 | Saito | 358/1.15 |
| 7,268,907 | B2 * | 9/2007 | Sato | 358/1.15 |
| 2001/0040693 | A1 * | 11/2001 | Saito et al. | 358/1.15 |
| 2001/0049745 | A1 * | 12/2001 | Schoeffler | 709/238 |
| 2002/0143924 | A1 * | 10/2002 | Iga | 709/223 |
| 2002/0157028 | A1 * | 10/2002 | Koue et al. | 713/202 |
| 2003/0041261 | A1 * | 2/2003 | Shukan | 713/200 |
| 2003/0117666 | A1 * | 6/2003 | Eguchi et al. | 358/402 |
| 2003/0233411 | A1 * | 12/2003 | Parry et al. | 709/206 |
| 2004/0196492 | A1 * | 10/2004 | Johnson et al. | 358/1.15 |

FOREIGN PATENT DOCUMENTS

| | | | |
|---|---|---|---|
| EP | 0 923 034 A1 | | 6/1999 |
| EP | 923034 A1 | * | 6/1999 |
| JP | 11-027499 | | 1/1999 |
| JP | 2000-222309 | | 8/2000 |
| JP | 2002041418 A | * | 2/2002 |
| JP | 2002-190898 | | 7/2002 |

OTHER PUBLICATIONS

Notice on Reason for Rejection mailed Aug. 16, 2005, directed to counterpart Japanese application.

* cited by examiner

*Primary Examiner* — Twyler L Haskins
*Assistant Examiner* — Huo Long Chen
(74) *Attorney, Agent, or Firm* — Morrison & Foerster LLP

(57) ABSTRACT

It is intended to provide a facsimile device and a program product for facsimile printing capable of surely making a user know receipt of an irregular e-mail such as an error mail or the like, without requiring extra volume of memory, while preventing waste of paper. When an e-mail is received, there is detected whether a printing mode is set or a not-printing mode is set for a body part of an e-mail in #2. Even though a not-printing mode is set for a body part of an e-mail (#2: No), the body part is printed in #8 in case the e-mail is not accompanied by an attached file of predetermined format (#5: No). Therefore, even if a not-printing mode is set, the facsimile device can make a user know receipts of irregular mails such as an error mail, an e-mail without an attached file of predetermined format, and rough causes of the irregular mails.

4 Claims, 6 Drawing Sheets nagata

SENDER :         ***** @b.co.jp
DATE AND TIME : yyy/mm/dd    14:00
TO :             nagata@a.co.jp
SUB :            error report THE E-MAIL FROM nagata@a.co.jp DATED yyy/mm/dd 11:00 DID NOT
REACH THE ABOVE DESIGNATED ADDRESS.REASON <naruyama@b.co.jp>
HOST UNKNOWN

FACSIMILE DEVICE AND PROGRAM PRODUCT FOR FACSIMILE PRINTING

This application is based upon and claims the benefit of priority from the prior Japanese Patent Application No. 2003-87975, the entire contents of which are incorporated herein by reference.

BACKGROUND OF THE INVENTION

1. Field of the Invention

The present invention relates to a facsimile device which can receive documents via internet and more particularly to a facsimile device and a program product for facsimile printing which surely make a user recognize that an irregular e-mail such as an error mail or the like is received, while preventing waste of paper.

2. Description of Related Art

In recent years, internet-facsimile devices which exchange documents via internet have begun to be popular, so as to reduce communication costs. In case of facsimile communication via internet like this, data is transmitted in a style of an e-mail. This is because a receiver is not always an internet-facsimile device, otherwise a personal computer and a portable terminal and the like can be a receiver. Accordingly, transmitted data includes a mail header, a text of the mail and the like, as its part. An image data of a document to be transmitted is added as its attached file. Accordingly, when an internet-facsimile device receives such data, body parts including mail header and a text of the mail as well as an image data obtained by opening an attached file are printed in general. As a matter of course, the latter is an essential document for a facsimile transmittal.

By the way, the above-mentioned printing of body parts is actually of little use as information for a receiver, since it is just a fixed form of sentence. Therefore, some internet-facsimile devices can be set not to print body parts, so as to prevent waste of paper.

However, such setting can cause a following drawback. That is, when a message is transmitted from an internet-facsimile device, a transmission error can take place due to failure in address indication, over volume, or the like. In this case, an error mail is returned from the server of receiver's side. Depending on a server, there is a case the error mail includes just body parts without an attached file. Information such as transmitted time, address, cause of error, and the like is described in the body parts of the returned mail. However, in case it is set not to print body parts, nothing is printed even though it receives an error mail. Received error mail will be deleted sooner or later. It means a transmission error is kept unknown to a user.

As an internet-facsimile device for preventing the above-mentioned situation, there is an image-data communication device described in EP0923034. Comparing a received e-mail with transmitted e-mails, the image-data communication device judges whether a received mail is an error mail or not. In case it is an error mail, necessary information is extracted, edited and finally printed.

However, in the image-data communication device described in EP0923034, a transmitted e-mail needs being saved for a while in case an e-mail goes out via facsimile transmission. Therefore, extra memory volume is required. Furthermore, such process does not work in case that an error mail is received after transmitted e-mails are deleted.

SUMMARY OF THE INVENTION

The present invention is to solve the above-described problems included in prior art. The present invention is to provide a facsimile device and a program product for facsimile printing capable of surely informing a user of receipt of irregular e-mail such as an error mail or the like, without requiring extra volume of memory, while preventing waste of paper.

According to one aspect of the present invention, there is provided a facsimile device comprising: an e-mail receiving unit that receives an e-mail addressed to an e-mail account allocated to the facsimile device; an attached-file discriminating unit that discriminates whether or not an e-mail that the facsimile device has received is accompanied by an attached file; a normal print determining unit that determines to print contents of an attached file without printing a body part of an e-mail in case the attached-file discriminating unit discriminates that the e-mail is accompanied by an attached file; and an error print determining unit that determines to print a body part of the e-mail in case the attached-file discriminating unit discriminates that the e-mail is not accompanied by an attached file.

In the facsimile device directed to the aspect of the present invention, the e-mail receiving unit receives an e-mail addressed to an e-mail account allocated to the facsimile device itself. When an e-mail is received, the attached-file discriminating unit discriminates whether or not the e-mail is accompanied by an attached file. In case the attached-file discriminating unit discriminates that the e-mail is accompanied by an attached file, the normal print determining unit determines to print contents of an attached file without printing a body part of the e-mail. In case the attached-file discriminating unit discriminates that the e-mail is not accompanied by an attached file, the error print determining unit determines to print a body part of the e-mail.

An e-mail transmitted out as a normal internet facsimile communication must be accompanied by an attached file. Accordingly, in case the facsimile device has received an e-mail with an attached file, the normal print determining unit determines not to print out the body part of the e-mail and only the contents of the attached file are printed. That is, an unnecessary part such as the body part of the e-mail is not printed. Thereby, waste of paper is avoided. In case an irregular mail such as an error mail and the like is received, the irregular mail may be not accompanied by an attached file. Accordingly, in case an irregular mail without an attached file is received, the error print determining unit determines to print the body part of the irregular mail. Subsequently, contents of the body part are printed. Thereby, a user can recognize the fact of the transmission error. In this case, it is not necessary for the facsimile device to save a transmitted mail. Accordingly, excessive volume of memory is not required for the facsimile device. Furthermore, even if an error mail reaches the facsimile device after the corresponding transmitted mail is deleted, it is no problem at all.

According to another aspect of the present invention, there is provided a facsimile device comprising: an e-mail receiving unit that receives an e-mail addressed to an e-mail account allocated to the facsimile device; a body-part-print setting unit that sets to print/not to print a body part of an e-mail that the facsimile device has received; an attached-file discriminating unit that discriminates whether or not an e-mail that the facsimile device has received is accompanied by an attached file; a normal print determining unit that determines whether or not to print a body part of the e-mail based on setting by the body-part-print setting unit and determines to print contents of an attached file in case the attached-file discriminating unit discriminates that the e-mail is accompanied by an attached file; and a body-part-print determining unit that determines to print a body part of the e-mail regardless of setting by the body-part-print setting unit in case the attached-file discriminating unit discriminates that the e-mail is not accompanied by an attached file.

In this aspect of the present invention, the body-part-print setting unit sets to print/not to print a body part of an e-mail that the facsimile device has received. Accordingly, setting by the body-part-print setting unit basically determines to print/not to print a body part of an e-mail. In case the attached-file discriminating unit discriminates that the received e-mail is accompanied by an attached file, the body part of the e-mail is printed. That is, the normal print determining unit determines to print contents of the attached file and also determines whether or not to print the body part of the e-mail in accordance with setting by the body-part-print setting unit. However, in case the attached-file discriminating unit discriminates that the e-mail is not accompanied by an attached file, different from basic processing, the body-part-print determining unit determines to print the body part of the e-mail regardless of setting by the body-part-print setting unit. Thereby, the facsimile device can surely make a user know receipt of an irregular mail such as an error mail without an attached file.

It is preferable that, in the inventive facsimile device, the attached-file discriminating unit discriminates that an e-mail is accompanied by an attached file only when an e-mail that the facsimile device has received is accompanied by an attached file of predetermined facsimile document format. Thereby, even if the received e-mail is accompanied by an attached file, the e-mail is handled as an e-mail without an attached file as long as the attached file is not in predetermined facsimile document format. In case the facsimile device is an internet facsimile device, it can possibly receive an e-mail transmitted from a personal computer. An e-mail from a personal computer can possibly be accompanied by an attached file format of which differs from predetermined facsimile document format such as document file or the like. However, such an e-mail is not what is essentially received by a facsimile device. Therefore, such a treatment manner of attached files is preferable.

The one aspect of the present invention is of course applicable to a program product for facsimile printing being installed in a computer of a facsimile device that receives an e-mail addressed to an e-mail account allocated to the facsimile device, the program product comprising: a computer readable medium; and a computer program stored on the computer readable medium, the computer program for performing the steps of: discriminating whether or not an e-mail that the facsimile device has received is accompanied by an attached file; determining to print contents of an attached file without printing a body part of an e-mail in case the e-mail is discriminated as accompanied by an attached file; and determining to print a body part of an e-mail in case the e-mail is discriminated as not accompanied by an attached file.

The another aspect of the present invention is of course applicable to a program product for facsimile printing being installed in a computer of a facsimile device that receives an e-mail addressed to an e-mail account allocated to the facsimile device, the program product comprising: a computer readable medium; and a computer program stored on the computer readable medium, the computer program for performing the steps of: setting to print/not to print a body part of an e-mail that the facsimile device has received; discriminating whether or not an e-mail that the facsimile device has received is accompanied by an attached file; determining whether or not to print a body part of an e-mail based on previous print/not print setting and determining to print contents of an attached file in case the e-mail is discriminated as accompanied by an attached file; and determining to print a body part of an e-mail regardless of previous print/not print setting in case the e-mail is discriminated as not accompanied by an attached file.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

For a better understanding of the present invention, reference is made to the following detailed description of the invention, just in conjunction with the accompanying drawings in which.

DETAILED DESCRIPTION OF THE PREFERRED EMBODIMENTS

Hereinafter, an embodiment of the present invention will be described in detail with reference to the accompanying drawings.

Figure 1:
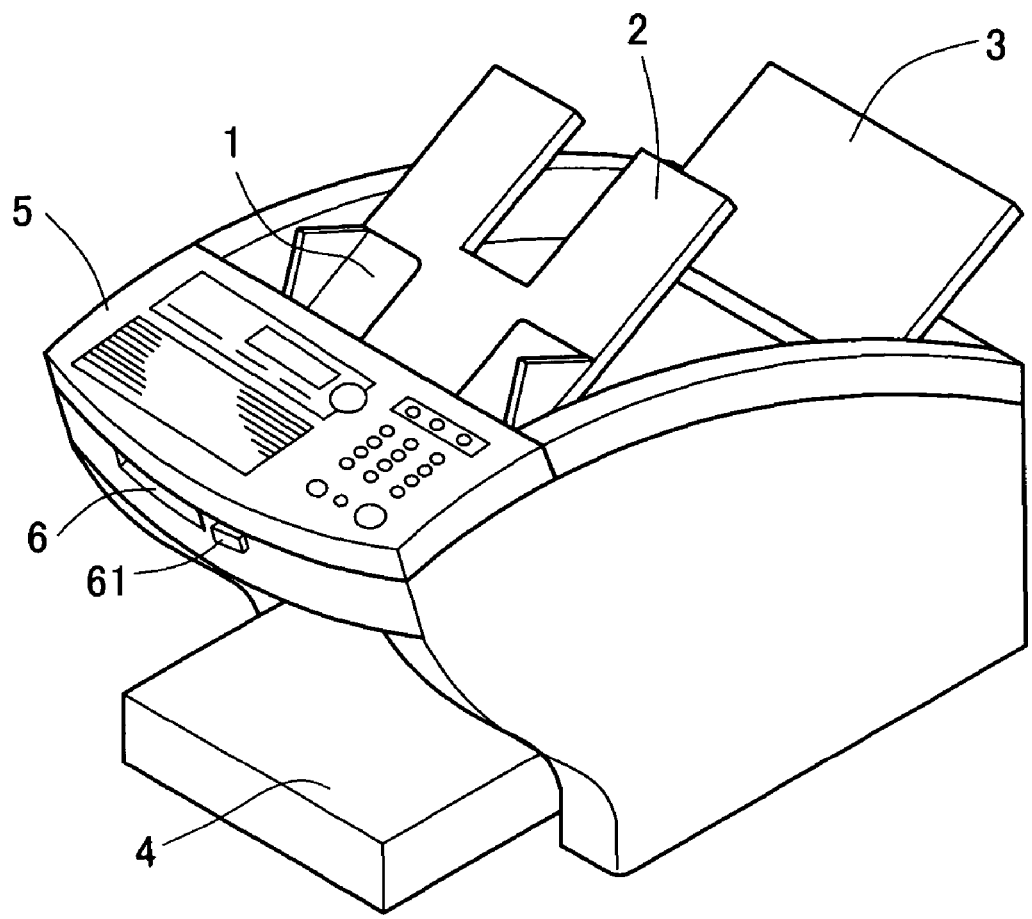
FIG. 1 shows an appearance of a facsimile device directed to an embodiment.

As shown in FIG. 1, a facsimile device according to this embodiment comprises a document feeder tray 1, a document ejector tray 2, a recording paper ejector tray 3, a recording paper supplier tray 4, an operation panel 5, an external memory insert slot 6, an external memory ejector button 61, and the like. The document feeder tray 1 is a place for loading documents to be faxed. Documents loaded thereon are supplied one by one for read. The document ejector tray 2 is to stock documents ejected after read. The recording paper ejector tray 3 is to stock sheets of recording paper on which in-coming contents are printed. The recording paper supplier tray 4 is to supply sheets of recording paper on which in-coming contents will be printed. The operation panel 5 is a place where buttons for a user to operate this facsimile device, and the like are placed. The external memory insert slot 6 is an insertion place for external memories such as a floppy disc, optical/magnetic disc, and the like. The external memory ejector button 61 is a button for ejecting an external memory inserted in the inside of the external memory insert slot 6.

Figure 2A:
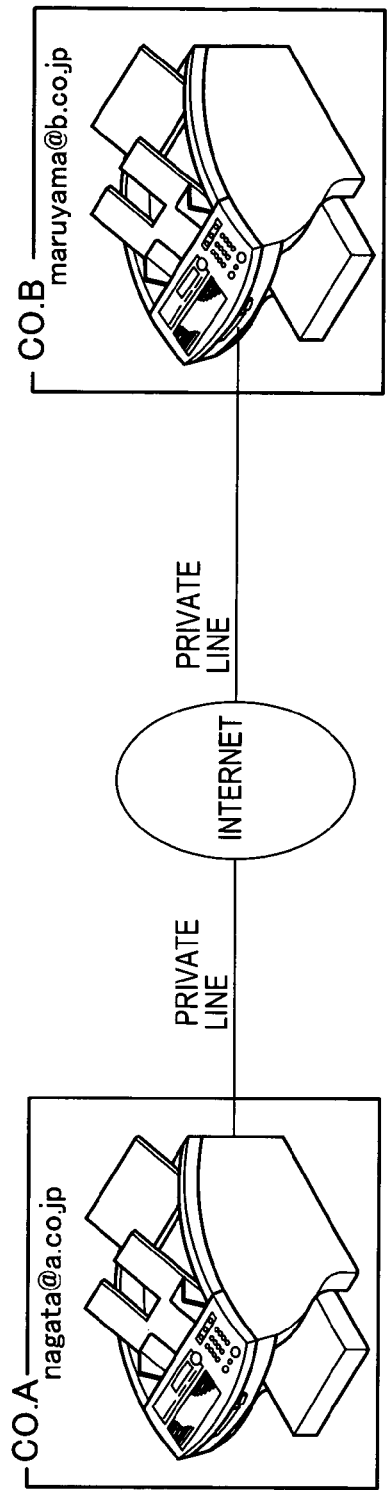
FIG. 2A shows an internet connection manner of the facsimile device of the embodiment.
Figure 2B:
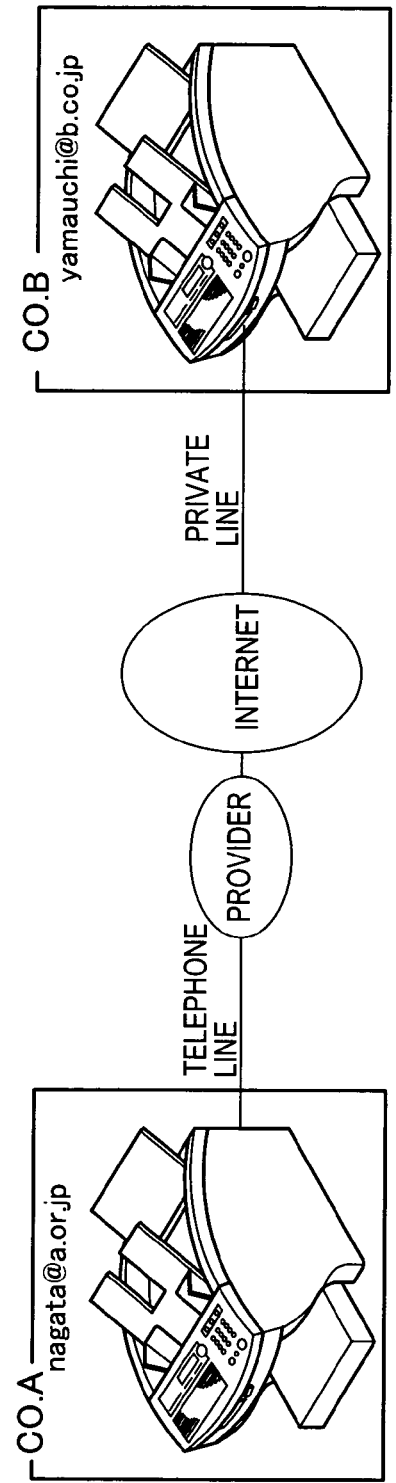
FIG. 2B shows another internet connection manner of the facsimile device of the embodiment.

As shown in FIG. 2, the facsimile device according to this embodiment is connected to internet. FIG. 2A shows a situation such that a facsimile device for Company A and a facsimile device for Company B are connected to internet via their respective private lines. An e-mail address of the facsimile device in Company A is nagata@a.co.jp. An e-mail address of the facsimile device in Company B is maruyama@b.co.jp. FIG. 2B shows a situation such that a facsimile device for Company A is connected to internet via a telephone line and a provider, and a facsimile device for Company B is connected to internet via a private line. An e-mail address of the facsimile device in Company A is nagata@a.or.jp. An e-mail address of the facsimile device in Company B is yamauchi@b.co.jp.

Figure 3:
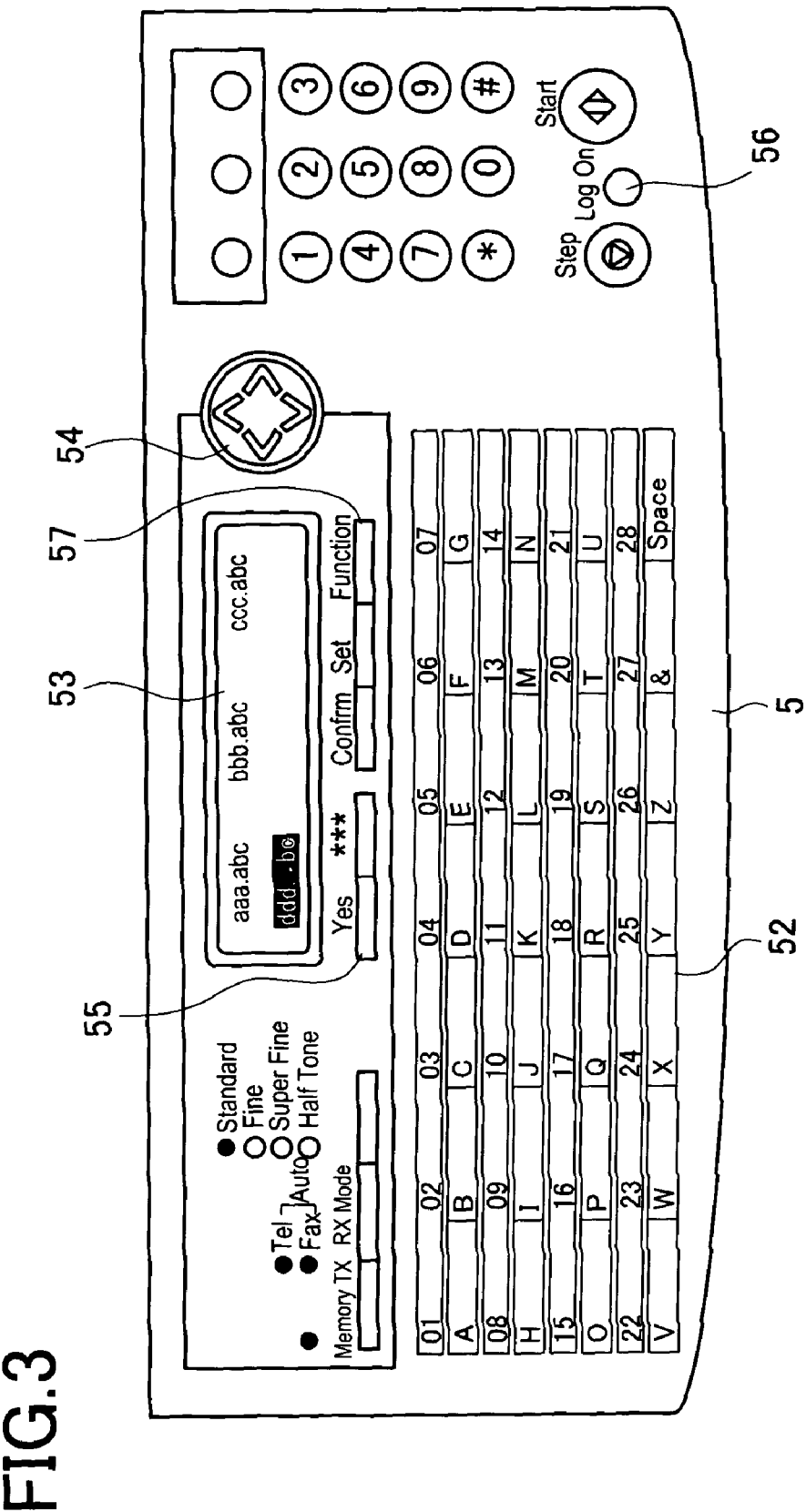
FIG. 3 is a top view of an operation panel directed to the facsimile device of the embodiment.

The operation panel 5 of the facsimile device according to this embodiment is constituted as shown in FIG. 3, a top view. The operation panel 5 comprises a plurality of one-touch dialing keys 52, a display 53, a cursor key 54, a Yes key 55, a log-on key 56, a function key 57, and the like. The one-touch dialing keys 52 are keys for registering e-mail addresses of receivers. The display 53 is a screen on which various kinds of indications necessary to operate and set the facsimile device, such as an indication of a binary file name are displayed. The cursor key 54 is a key for moving a cursor displayed on the display 53. The Yes key 55 is a key for responding to a message displayed in the display 53. The log-on key 56 is a key for logging on to internet. The function key 57 is a key for pursuing and setting various kinds of functions.

Figure 4:
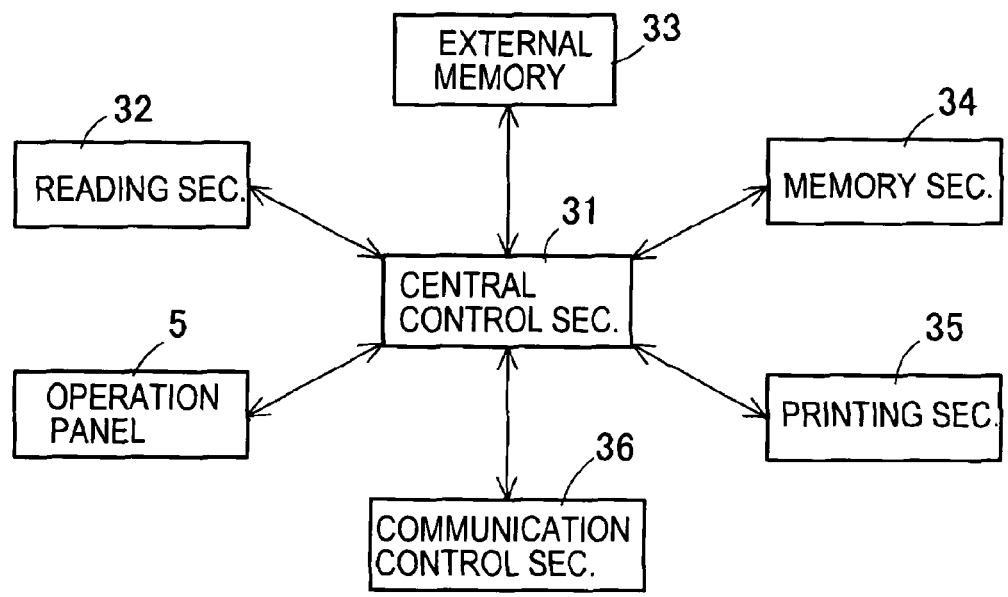
FIG. 4 is a block diagram showing schematic structure of the facsimile device of the embodiment.

The facsimile device according to this embodiment is constituted as shown in block diagram of FIG. 4, in general. That is, this facsimile device comprises a central control section 31, a reading section 32, a memory section 34, a printing section 35, and a communication control section 36, other than the operation panel 5. The central control section 31 is a block for controlling the entirety of the facsimile device. The reading section 32 is a section for reading image data of documents supplied sheet by sheet from the document feeder tray 1. The memory section 34 is a block for recording a control program, various setting values for controlling, received data, and the like. The printing section 35 is a section for printing received image data on sheets of recording paper. The communication control section 36 is a section for exchanging e-mails by way of connection with internet. An external memory 33 inserted in the inside of the external memory insert slot 6, stores decoded binary data and the like.

Facsimile transmission by way of the facsimile device according to this embodiment is prosecuted as following. That is, an image of a document supplied one by one from the document feeder tray 1 is read at the reading section 32. Image data read there is converted to a file of predetermined facsimile document format (TIFF format, pict format, and the like), and stored in the memory section 34 in a form of the above-mentioned file format. And an e-mail with the file as an attached file is sent out to internet, forwarding to an e-mail address of a receiver.

In the facsimile device according to this embodiment, when an e-mail is received, the communication control section 36 makes access to a mail server on which its mail account is registered for checking if there is an e-mail addressed to its e-mail account. In case there is an e-mail addressed to its account, the e-mail is downloaded to the memory section 34 from the mail server. This processing is conducted in a predetermined cycle set in advance. The cycle is able to be adjusted by a user, and the processing is also conducted when a user pushes the log-on key 56.

Figure 5:
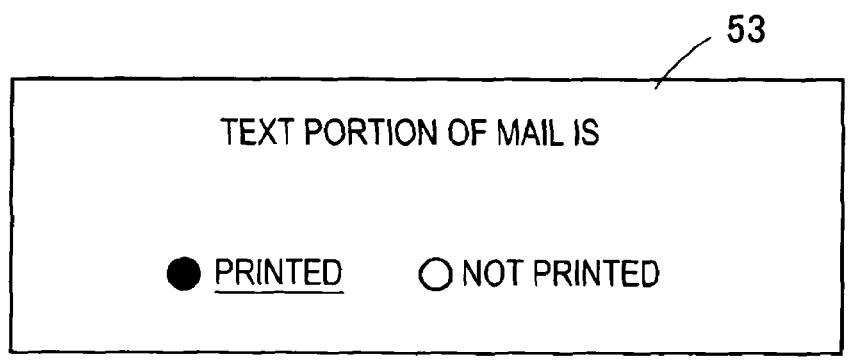
FIG. 5 shows a display to set a printing mode.

The facsimile device according to this embodiment has both a printing mode and not-printing mode so as to print/not to print a body part of an e-mail (mail header and a text part, and the like) when an e-mail is received as facsimile transmission. A user can select and set to one of the modes. For the setting, the function key 57 is continuously pushed to display contents shown in FIG. 5 in the display 53. With the display as shown in FIG. 5, a user elects "print" or "not print" using the cursor key 54, and pushes the Yes key 55 for confirming the election. This election is overwritten on the last election and saved.

Next, there will be explained a processing performed in the facsimile device according to this embodiment when an e-mail is received referring to a flow chart of FIG. 6. In this processing, whether an e-mail is received or not is judged at first (#1). In case that no e-mail is received (#1: No), it ends the processing promptly.

In case there is received an e-mail (#1: Yes), processing goes on to #2 to judge whether a printing mode to print a body part of an e-mail is selected or not (#2). That is, there is checked contents set on display as shown in FIG. 5. In case a mode is set to print a body part (#2: Yes), processing goes on to #3 to judge whether a received e-mail is accompanied by an attached file or not (#3). In this processing, "Yes" judgment is made, only when an e-mail is accompanied by an attached file in the above-mentioned facsimile document format.

In case a received e-mail is accompanied by an attached file in facsimile document format (#3: Yes), the e-mail is considered to be transmitted as a facsimile communication. Therefore, a body part is printed (#4), an image of the attached file is opened (#6), and the opened image is printed (#7). Since a mode is set to a "printing" mode on display as shown in FIG. 5, a body part is printed. The attached file is decoded in binary data and recorded in an external memory 33.

Figures 7, 8:
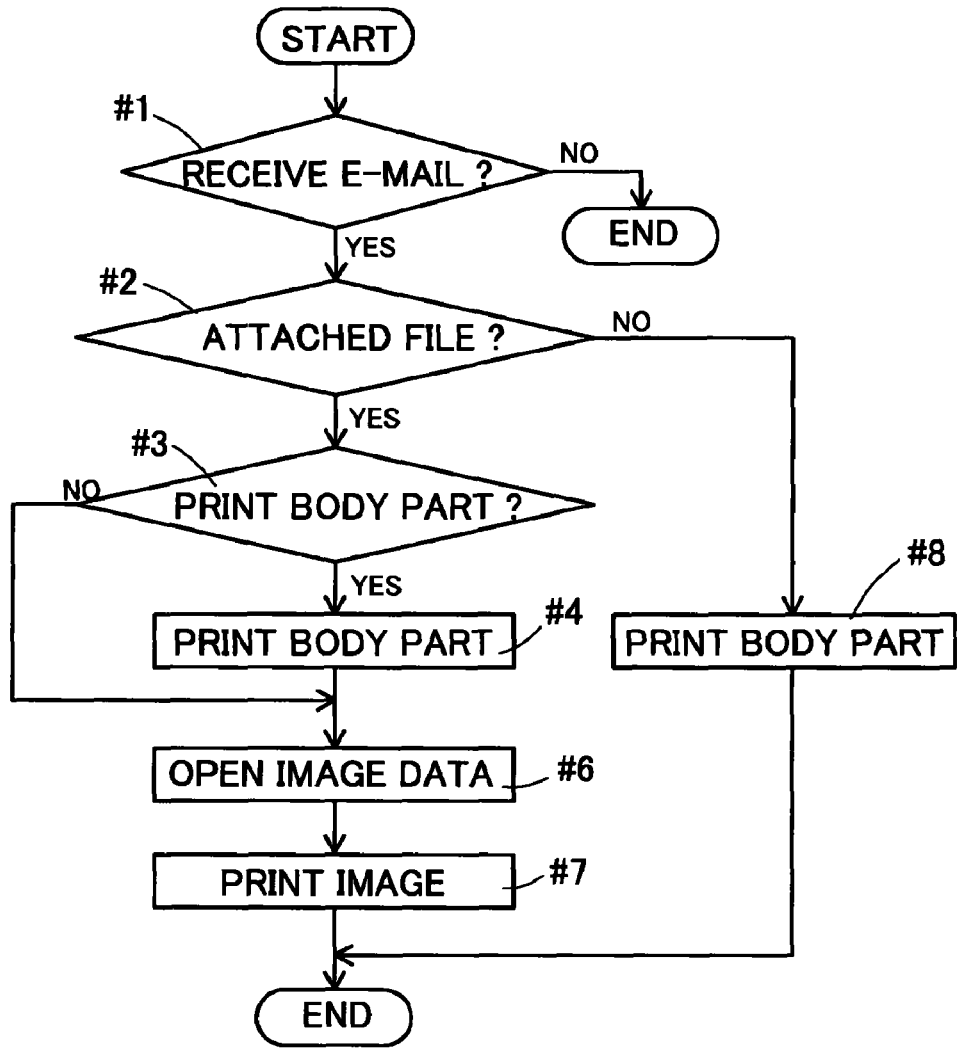
FIG. 7 is a flowchart illustrating another example of mail-receipt operation in the facsimile device of the embodiment.
FIG. 8 shows an example of a print-out obtained when an error mail is received.

In #3, in case an attached file in facsimile document format does not accompany a received e-mail (#3: No), the e-mail is considered to be transmitted as a non-normal facsimile communication. For example, it can be considered a facsimile communication once transmitted but sent back from a receiver's server as an error mail, or a communication sent to the facsimile device as a normal e-mail erroneously. Especially in the former case, usually, an e-mail does not include any attached files but contains error information appearing in a text portion of a body part. Accordingly, a body part is printed (#8). Thereby, a user can recognize the fact that there is received an unusual e-mail. Particularly, in case the e-mail is an error mail, contents as shown in FIG. 8 is printed. Thereby, a user can understand a facsimile communication which he has transmitted is undelivered. And the processing terminates.

In #2, in case a mode is set not to print a body part (#2: No), processing goes on to #5 to judge whether a received e-mail is accompanied by an attached file or not (#5). Similar to the above-mentioned case of #3, "Yes" judgment is made in this processing, only when an e-mail is accompanied by an attached file in facsimile document format.

In case a received e-mail is accompanied by an attached file in the above-mentioned format (#5: Yes), the e-mail is considered to be sent as a facsimile communication. Therefore, an image of the attached file is opened (#6), and printed without printing of a body part (#7). Since a mode is set to "not-printing" mode on display as shown in FIG. 5, a body part is not printed. Thereby, a user can avoid wasting paper for printing unnecessary information. And the processing terminates.

In #5, in case a received e-mail is not accompanied by an attached file in the above-mentioned format (#5: No), similar to the case #3: No, the e-mail is considered not to be transmitted as a normal facsimile. Accordingly, a body part is printed (#8). Thereby, a user can recognize that there is received such kind of e-mail, despite a not-printing mode setting for a body part of an e-mail. Especially in case the e-mail is an error mail, a user can understand a facsimile communication which he has transmitted is undelivered. And the processing terminates.

Figure 6:
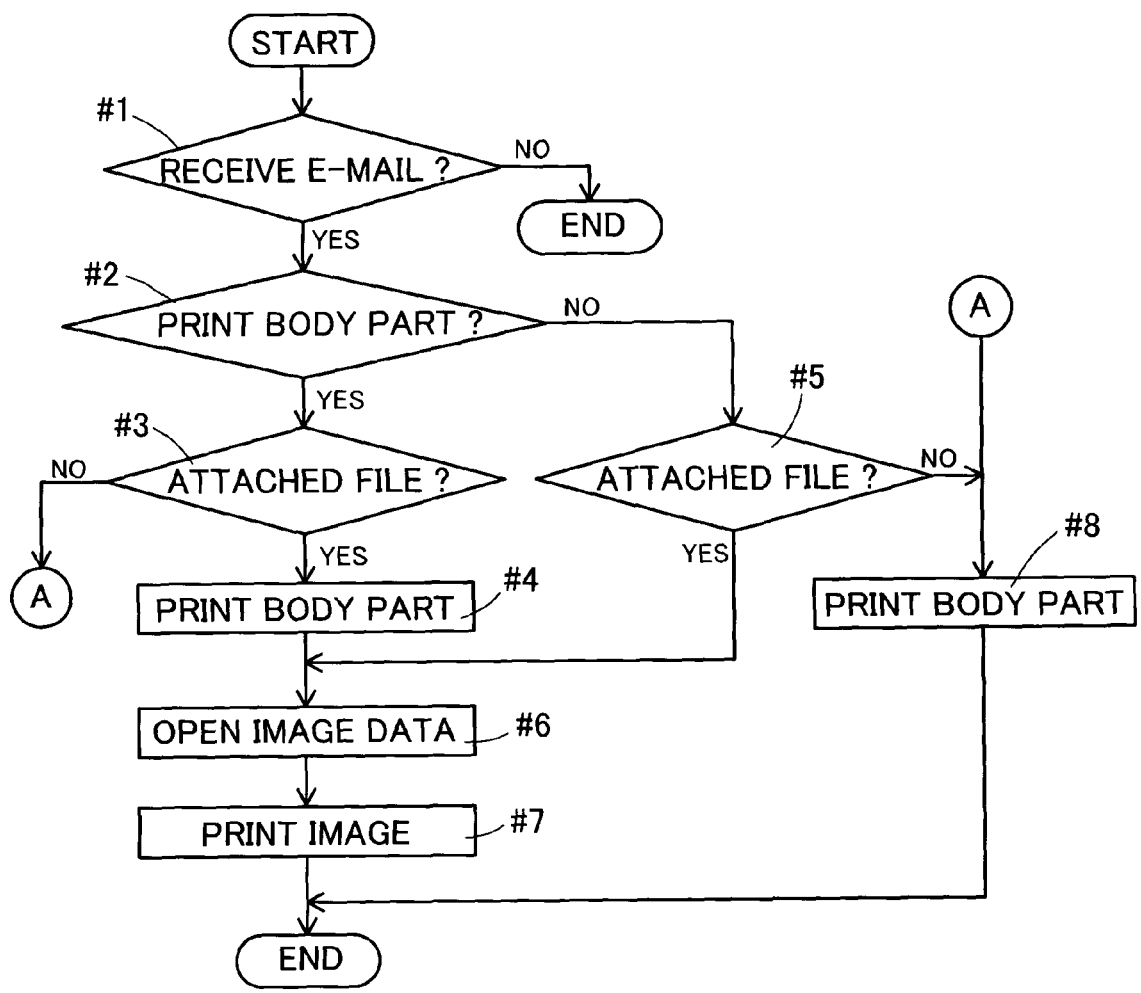
FIG. 6 is a flowchart illustrating mail-receipt operation in the facsimile device of the embodiment.

All of the processing in FIG. 6 thus completes. In case a plurality of e-mails is received, the same processing is applied to each e-mail.

In flow chart of FIG. 6, processing is carried out in the following order: firstly judge whether a mode is set to print a body part of an e-mail or not (#2); and secondly judge whether a received e-mail is accompanied by a predetermined format of attached file or not (#3). However, the processing order can be reversed. A flow chart of reversed order is shown in FIG. 7.

In this case, when "Yes" (received) judgment is made in #1, there is made judgment on whether a received e-mail is accompanied by an attached file in predetermined format or not (#12), firstly. In case there is an attached file (#12: Yes), there is next made judgment on whether a mode is set to print a body part or not (#13). In case a mode is set to print a body part (#13: Yes), a body part is printed (#4), an image of an attached file is opened (#6), and the opened image is printed (#7). In case a mode is set not to print a body part (#13: No), an image of an attached file is opened (#6), and the opened image is printed (#7). In case a received e-mail is not accompanied by an attached file in predetermined format (#12: No), a body part is printed (#8) without judging of "printing" mode/"not-printing" mode. Thereby, similar to the case of flow chart in FIG. 6, a user can recognize that there is received such kind of e-mail, even though a mode is set not to print a body part of an e-mail.

As explained above in detail, in the facsimile device according to this embodiment, when an e-mail is received, there is made judgment on whether a received e-mail is accompanied by an attached file in predetermined format, or not (#3, #5, #12). In case an attached file in predetermined format does not accompany (#5: No, #12: No), regardless of "printing"/"not-printing" mode setting, a body part of an e-mail is printed (#8). Therefore, even though a mode is set not to print a body part, this manner of processing can make a user recognize that there is received an e-mail which is not accompanied by an attached file in predetermined format, such as error mail, or the like. In addition, this processing can make a user recognize a content of a body part of the received e-mail.

Consequently, in case an e-mail transmitted as a facsimile communication is undelivered for some reason, a sender can recognize the fact and rough cause of failure. On the other hand, even if a mode is set not to print a body part, a sender can recognize failure and rough cause of it. Thereby, there can be avoided wasting unnecessary paper for printing a body part, when receiving a normal facsimile communication. Further, even if an e-mail transmitted as a facsimile communication is not saved, a sender can recognize failure and rough cause of it. Therefore, there is no problem, even if an error mail is received after a corresponding transmitted e-mail is deleted. Hence, it is not necessary to store a transmitted e-mail for a long time. Therefore, the facsimile device of this embodiment does not need an excessive memory volume.

The above described embodiments are provided as mere examples, and do not mean that the present invention is limited. Of course, various modifications and/or variations can occur without departing from the gist of the invention. For example, in the facsimile device according to this embodiment, receipt of an e-mail is performed in personal computer system, i.e., the facsimile device itself gets access to a mail server to receive an e-mail. However, without being limited thereto, the facsimile device can apply portable terminal system in which a mail server transfers an e-mail to a portable terminal and a bell rings when an e-mail reaches the portable terminal. In addition, the facsimile device can be compatible with a normal facsimile exchange via telephone line, other than internet facsimile. In addition, not restricted to facsimile function, the facsimile device can be compatible with normal e-mail exchange. In this case, a mode can be set to print the contents in case there is received an attached file in a format other than the above-mentioned predetermined format. In addition, the facsimile device can be designed such that a user cannot set to print a body part. In other words, the facsimile device can be fixedly set "not-printing" on a display of FIG. 5. In addition, it is not indispensable to immediately print a body part of an e-mail and a content of an attached file.

As obvious from the above explanation, according to the present invention, there are realized a facsimile device and a facsimile printing program that surely make a user recognize the receipt, in case it receives an irregular e-mail such as an error mail or the like, without requiring an extra memory, preventing waste of paper.

What is claimed is:

1. A facsimile device, comprising:
   an e-mail transmitting unit that transmits an e-mail to a destination address;
   an e-mail receiving unit that receives an e-mail, having a body part, addressed to an e-mail account allocated to the facsimile device;
   a body-part-print setting unit that sets to print or not to print the body part of the e-mail that the device e-mail receiving unit has received;
   an attached-file discriminating unit that determines whether the e-mail that the e-mail receiving unit has received is accompanied by an attached file;
   a normal print determining unit that determines whether to print the body part of the e-mail based on a setting set by the body-part-print setting unit and determines to print contents of the attached file, when the attached-file discriminating unit determines that the e-mail is accompanied by the attached file;
   an error mail discriminating unit that determines that an e-mail currently received by the e-mail receiving unit is an error mail which notifies that an previously e-mail transmitted by the e-mail transmitting unit is undelivered when the currently received e-mail is not accompanied by the attached file; and
   a body-part-print determining unit that orders printing of the body part of the e-mail regardless of the setting set by the body-part-print setting unit when the error mail discriminating unit determines that the e-mail is the error mail.

2. A facsimile device according to claim 1, wherein the attached-file discriminating unit determines that the e-mail is accompanied by the attached file only when the e-mail that the e-mail receiving unit has received is accompanied by the attached file of a predetermined facsimile document format.

3. A program product for facsimile printing installed on a computer of a facsimile device that receives an e-mail, having a body part, addressed to an e-mail account allocated to the facsimile device, the program product comprising:
   a non-transitory computer readable medium; and
   a computer program stored on the non-transitory computer readable medium, the computer program causing the computer to:
   set a print setting to print or not to print the body part of an e-mail that the facsimile device has received;
   determine whether the e-mail that the facsimile device has received is accompanied by an attached file;

determine whether to print the body part of the e-mail based on a previously set print setting and determine to print contents of the attached file, when the e-mail is determined as accompanied by the attached file;

determine that the e-mail received by the facsimile device is an error mail which notifies that an e-mail previously transmitted by the facsimile device is undelivered when the e-mail received by the facsimile device is not accompanied by the attached file; and order printing of the body part of the e-mail regardless of whether the print setting is previously set to prim or not print when the e-mail is determined as the error mail.

4. A program product for facsimile printing according to claim 3, wherein only the e-mail that is accompanied by the attached file of a predetermined facsimile document format is determined as the e-mail accompanied by the attached file.

* * * * *

UNITED STATES PATENT AND TRADEMARK OFFICE
CERTIFICATE OF CORRECTION

| | | |
|---|---|---|
| PATENT NO. | : 7,957,036 B2 | Page 1 of 1 |
| APPLICATION NO. | : 10/641018 | |
| DATED | : June 7, 2011 | |
| INVENTOR(S) | : Koichi Nagata et al. | |

It is certified that error appears in the above-identified patent and that said Letters Patent is hereby corrected as shown below:

On the title page:

Under section (75) Inventors, please replace the city of residence of the third listed inventor from "Toyohashi-gun" to --Toyohashi--.

At column 10, claim 3, line 2, please replace "prim" with --print--.

Signed and Sealed this
Second Day of August, 2011

David J. Kappos
*Director of the United States Patent and Trademark Office*